United States Patent
Mihara

(10) Patent No.: US 9,626,137 B2
(45) Date of Patent: Apr. 18, 2017

(54) IMAGE FORMING APPARATUS, SERVER DEVICE, INFORMATION PROCESSING METHOD, AND COMPUTER-READABLE STORAGE MEDIUM

(71) Applicant: CANON KABUSHIKI KAISHA, Tokyo (JP)

(72) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/287,989

(22) Filed: May 27, 2014

(65) Prior Publication Data

US 2014/0355034 A1    Dec. 4, 2014

(30) Foreign Application Priority Data

May 29, 2013  (JP) ................................ 2013-113053

(51) Int. Cl.
 *G06K 15/00* (2006.01)
 *G06F 3/12* (2006.01)
(52) U.S. Cl.
 CPC .......... *G06F 3/1238* (2013.01); *G06F 3/1222* (2013.01); *G06F 3/1288* (2013.01)
(58) Field of Classification Search
 None
 See application file for complete search history.

(56) References Cited

U.S. PATENT DOCUMENTS

| | | | |
|---|---|---|---|
| 2010/0115268 A1* | 5/2010 | Kudo | 713/156 |
| 2012/0117629 A1* | 5/2012 | Miyazawa et al. | 726/4 |
| 2013/0080885 A1* | 3/2013 | Boyd | G06F 17/243 715/255 |
| 2013/0269019 A1* | 10/2013 | Garmark et al. | 726/9 |
| 2014/0223516 A1* | 8/2014 | Vongsouvanh | H04L 63/0492 726/4 |

FOREIGN PATENT DOCUMENTS

JP    2012-243114 A    12/2012

* cited by examiner

*Primary Examiner* — John Wallace
(74) *Attorney, Agent, or Firm* — Canon U.S.A., Inc. IP Division

(57) ABSTRACT

An image forming apparatus includes first and second token request transmission units, first and second token reception units, a storage unit, and a device resource request transmission unit. The first token request transmission unit transmits a first token acquisition request containing device credential information. The first token reception unit receives a first token corresponding to the device credential information. The storage unit stores the received first token. The second token transmission unit acquires the stored first token and sends a second token acquisition request containing the acquired first token and identification information for identifying a management unit that manages a device resource. The second token reception unit receives a second token corresponding to the identification information. The device resource request transmission unit transmits a request for a process related to a device resource, the request containing the received second token.

12 Claims, 15 Drawing Sheets

2100

| ACCESS PRIVILEGE MANAGEMENT TABLE | | | |
|---|---|---|---|
| 2101 | 2102 | 2103 | 2104 |
| CLIENT ID | SERIAL NUMBER | USER ID | ACCESS PRIVILEGE |
| dev00000001 | #0000001 | user01 | EDIT |
| dev00000002 | #0000002 | user01 | EDIT |
| | | | |

FIG. 4A

| USER MANAGEMENT TABLE | | | | 1200 |
|---|---|---|---|---|
| USER ID (1201) | PASSWORD (1202) | USER TYPE (1203) | ROLE (1204) | |
| uid00000001 | ******** | USER | CustomerAdmin | |
| dev00000001 | ************** | CLIENT | | |
| uid00000002 | ******* | USER | Customer | |
| | | | | |

FIG. 4B

| CLIENT MANAGEMENT TABLE | | | | 1300 |
|---|---|---|---|---|
| CLIENT ID (1301) | CLIENT NAME (1302) | REDIRECT URL (1303) | SERIAL NUMBER (1304) | |
| dev00000001 | ************** | https://dev01/redirect | #0000001 | |
| | | | | |

FIG. 4C

AUTHORIZATION TOKEN MANAGEMENT TABLE 1400

| AUTHORIZATION TOKEN ID 1401 | TOKEN TYPE 1402 | EXPIRATION DATE 1403 | SCOPE 1404 | REFRESH TOKEN ID 1405 | REFRESH EXPIRATION DATE 1406 | CLIENT ID 1407 | USER ID 1408 | APPLICATION ID 1409 |
|---|---|---|---|---|---|---|---|---|
| AT_000000 | AUTHORIZATION CODE | 09/30/2013 11:00:00 | RESOURCE A | | | dev00000001 | uid00000001 | |
| AT_000001 | PARENT TOKEN | 09/30/2013 12:00:00 | RESOURCE A | RT_000001 | 09/30/2014 12:00:00 | dev00000001 | uid00000001 | |
| AT_000002 | CHILD TOKEN | 09/30/2013 13:00:00 | RESOURCE A | | | dev00000001 | uid00000001 | app00000001 |
| AT_000003 | PARENT TOKEN | 09/30/2013 16:00:00 | | RT_000002 | 09/30/2014 16:00:00 | dev00000001 | uid00000002 | |
| AT_000010 | DEVICE PARENT TOKEN | 09/30/2013/11:00:00 | | RT_000010 | 09/30/2014 11:00 | dev00000001 | | |
| AT_000011 | DEVICE CHILD TOKEN | 09/30/2013/12:00:00 | RESOURCE A | | | dev00000001 | | app00000001 |
| | | | | | | | | |

FIG. 5A

DEVICE USER MANAGEMENT TABLE 1500

| USER ID 1501 | PASSWORD 1502 | IC CARD INFORMATION 1503 | PRIVILEGE INFORMATION 1504 |
|---|---|---|---|
| user001 | ******** | ***** | admin |
| user002 | ******** | ***** | user |
|  |  |  |  |

FIG. 5B

DEVICE MANAGEMENT TABLE 1600

| CLIENT ID 1601 | CLIENT SECRET 1602 | END POINT URL 1603 | REDIRECT URL 1604 |
|---|---|---|---|
| dev00000001 | ************** | https://authz/oauth | https://dev01/redirect |

FIG. 5C

PARENT TOKEN MANAGEMENT TABLE 1700

| USER ID 1701 | AUTHORIZATION TOKEN ID 1702 | REFRESH TOKEN ID 1703 |
|---|---|---|
| user001 | AT_000001 | RT_000001 |
| user002 | AT_000003 | RT_000002 |
|  | AT_000010 | RT_000010 |

FIG. 7

| DEVICE DATA MANAGEMENT TABLE 1900 ||| 
|---|---|---|
| CLIENT ID 1901 | SERIAL NUMBER 1902 | DATA 1903 |
| dev00000001 | #0000001 | XXXXXXXXXX |
| dev00000002 | #0000002 | YYYYYYYYYY |
| | | |

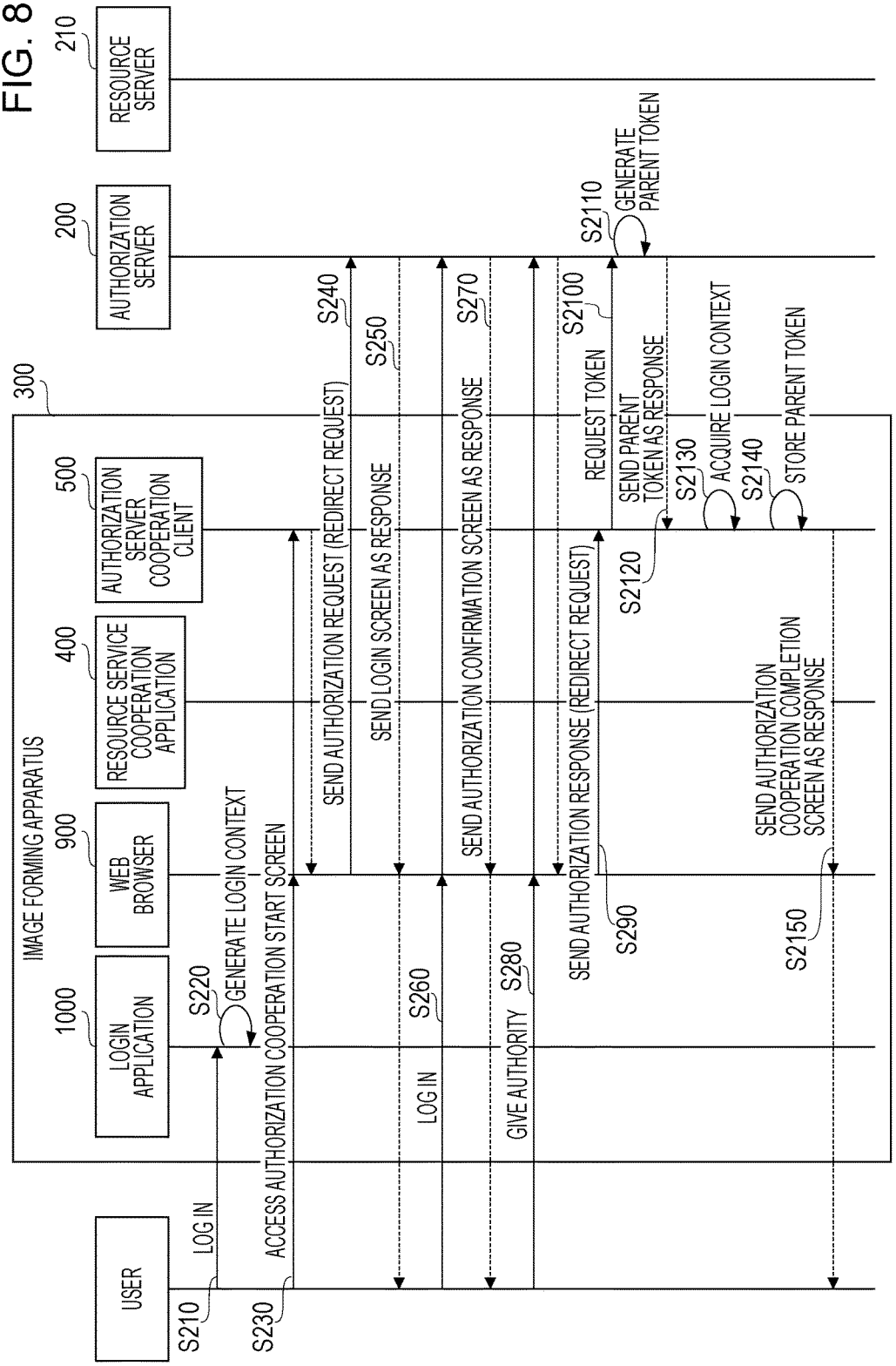

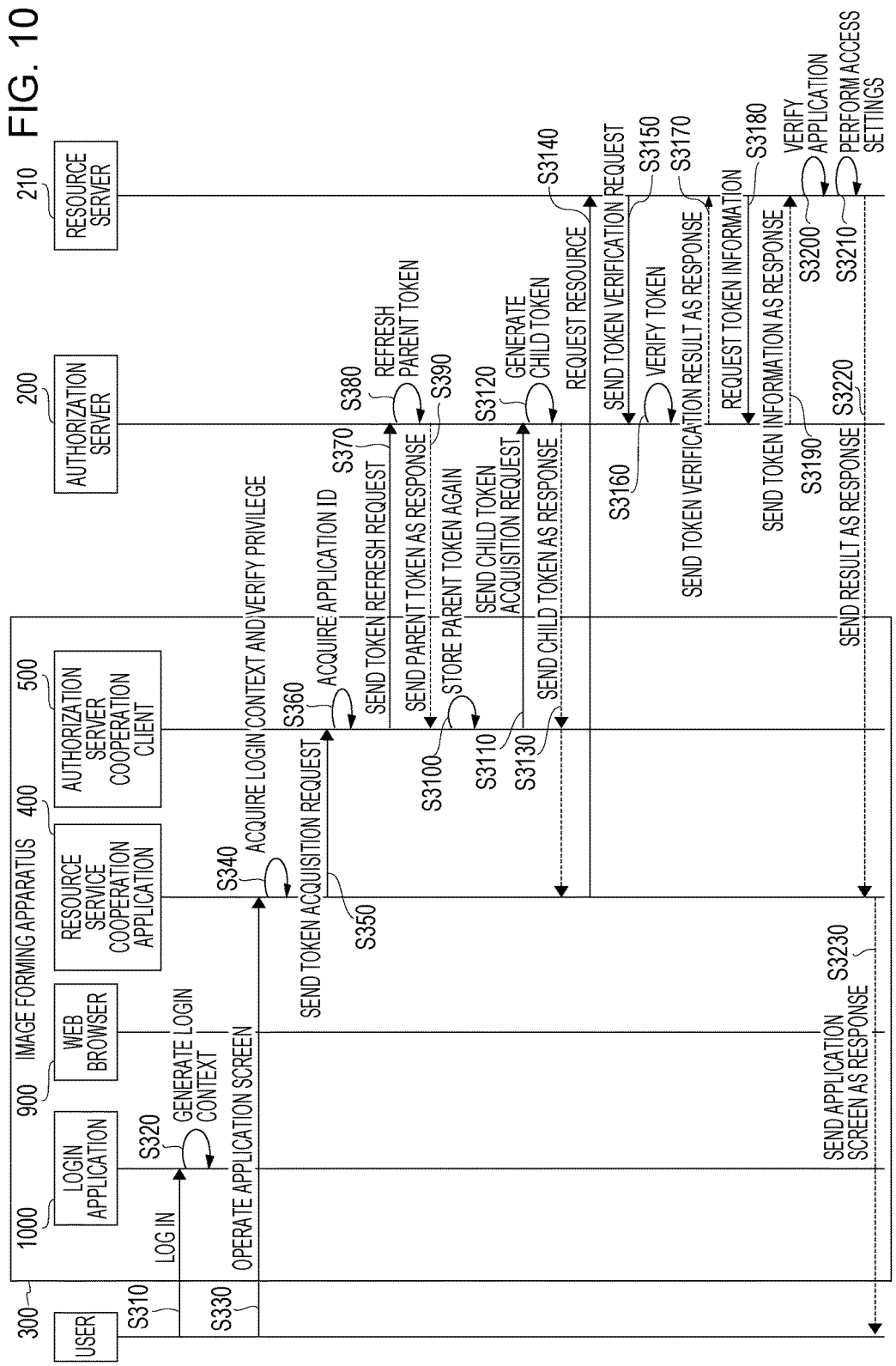

FIG. 11

| ACCESS PRIVILEGE MANAGEMENT TABLE | | | |
|---|---|---|---|
| CLIENT ID | SERIAL NUMBER | USER ID | ACCESS PRIVILEGE |
| dev00000001 | #0000001 | user01 | EDIT |
| dev00000002 | #0000002 | user01 | EDIT |
|  |  |  |  |

IMAGE FORMING APPARATUS, SERVER DEVICE, INFORMATION PROCESSING METHOD, AND COMPUTER-READABLE STORAGE MEDIUM

BACKGROUND OF THE INVENTION

Field of the Invention

The present invention relates to an image forming apparatus, a server device, an information processing method, and a computer-readable storage medium.

Description of the Related Art

In recent years, for example, a service to generate a PDF electronic document and a service to store electronic documents through the Internet have been provided. By using such services, users can generate a PDF document even when they do not install a PDF generation function in their terminals. In addition, the users can store electronic documents that require storage capacity greater than that of their terminal. Furthermore, in recent years, a cloud service has been widely spread (refer to, for example, Japanese Patent Laid-Open No. 2012-243114).

SUMMARY OF THE INVENTION

When, in a server used for providing a cloud service, a device resource and the information regarding users who are allowed to edit the device resource are managed in association with each other and if the user information is deleted from the server, the device resource cannot be edited.

The present invention provides an apparatus and a method that allow users to edit a device resource on a server even when the user information is deleted from the server.

According to an aspect of the present invention, an image forming apparatus includes a first token request transmission unit configured to transmit, to a server device, a first token acquisition request containing credential information of a device, a first token reception unit configured to receive, from the server device, a first token corresponding to the credential information of the device, a storage unit configured to store the first token received by the first token reception unit, a second token transmission unit configured to acquire the first token stored in the storage unit and send, to the server device, a second token acquisition request containing the acquired first token and identification information for identifying a management unit that manages a device resource, a second token reception unit configured to receive, from the server device, a second token corresponding to the identification information, and a device resource request transmission unit configured to transmit, to the server device, a request for a process related to a device resource, the request containing the second token received by the second token reception unit.

Further features of the present invention will become apparent from the following description of exemplary embodiments with reference to the attached drawings.

According to the present invention, even when the user information is deleted from a server, the device resource in the server can be edited.

BRIEF DESCRIPTION OF THE DRAWINGS

FIGS. 4A to 4D illustrate examples of data tables stored in an external memory by an authorization server.

FIGS. 5A to 5C are examples of data tables stored in an external memory by an image forming apparatus.

FIG. 7 illustrates an example of a device data management table stored in an external memory by a resource server.

FIG. 8 is a second diagram illustrating an example of a sequencing process.

FIG. 10 is a third diagram illustrating an example of a sequencing process.

FIG. 11 illustrates an example of an access right management table.

DESCRIPTION OF THE EMBODIMENTS

Figure 1:
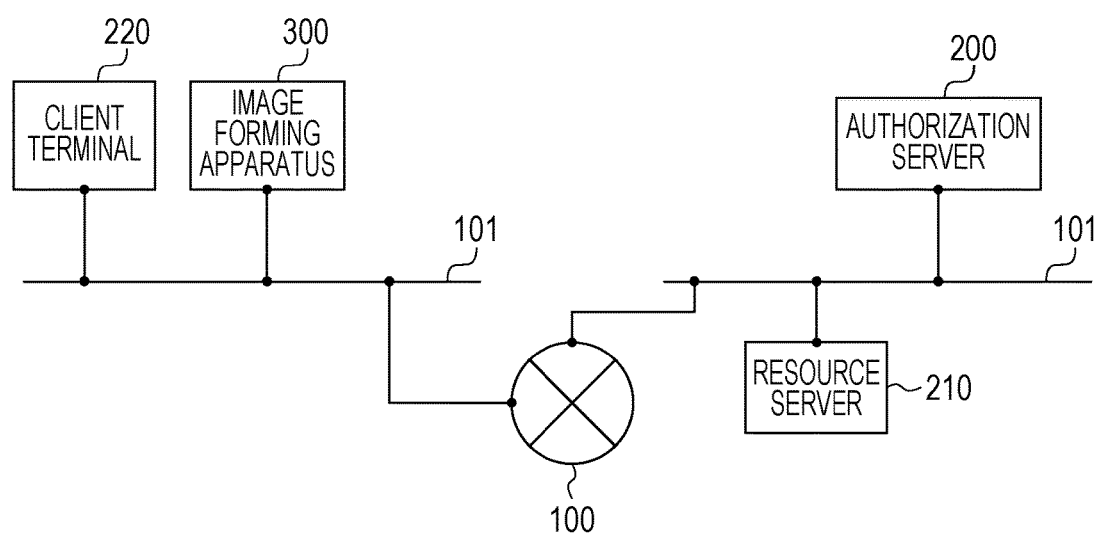
FIG. 1 illustrates an example of the system configuration of a device resource management system.

Exemplary embodiments of the present invention are described below with reference to the accompanying drawings.

First Exemplary Embodiment

A first exemplary embodiment is described below with reference to the case in which a service to synchronously store data of an image forming apparatus over the Internet and a service to edit stored data are installed in a server (a server device) on the Internet.

Hereinafter, a service that is provided over the Internet, such as the above-described services, is referred to as a "resource service".

In addition, according to the present exemplary embodiment, the case in which a data synchronization application installed in an image forming apparatus cooperates with a resource service is discussed.

Hereinafter, an application that uses a resource service, such as the data synchronization application, is referred to as a "resource service cooperation application". Note that the resource service is not limited to the above-described service and, in addition, the application is not limited to the data synchronization application.

According to the present exemplary embodiment, to delegate authentication, OAuth is used. In OAuth, information called "token" is used to verify the authentication delegated from a user. In particular, a token used when a user delegates authentication to the image forming apparatus is referred to as a "parent token". According to the present exemplary embodiment, user authentication is delegated to a device, such as an image forming apparatus. Hereinafter, for example, the case in which a print application and a form application are installed in the image forming apparatus is discussed.

In such a case, if a user uses a resource service through the print application, the user needs to delegate authentication to the print application. Similarly, if a user uses a resource service through the form application, the user needs to delegate authentication to the form application.

From the user's point of view, when the user uses the resource service from the image forming apparatus, it is desirable that the user perform, for example, only one action for user grant so as to use the resource service.

Accordingly, when the user delegates authentication to the applications and if the image forming apparatus delegates the authentication to the applications on behalf of the user, the number of actions for user grant required for the user can be reduced.

That is, when the user delegates the authentication to the image forming apparatus, the user also allows the image forming apparatus to delegate the authentication to the applications.

However, in order to perform all the actions for user grant in one go, it is undesirable that a parent token acquired by the image forming apparatus be shared with the applications in the image forming apparatus. This is because all the applications that share the parent token possibly access all of resource services. That is, if an application accesses a resource service using a shared parent token, the resource service cannot identify the application that accesses the resource service and, thus, cannot determine whether the access is granted. To address such an issue, each of the resource service cooperation applications uses a token that is issued only for the application in order to re-delegate authentication and that inherits the information of a parent token when the user delegates authentication to the image forming apparatus. According to the present exemplary embodiment, the token generated from the parent token for each of the applications in order to re-delegate authentication is referred to as a "child token".

Furthermore, according to the present exemplary embodiment, a user on a virtual server corresponding to the image forming apparatus is referred to as a "device client". The information used for verifying the authentication delegated from the device client is referred to as a "device token". A token used for the device client to delegate authentication to the image forming apparatus is referred to as a "device parent token". Still furthermore, a device token that is generated from the device parent token and that is issued in order to re-delegate authentication to each of the applications is referred to as a "device child token".

A device resource management system that uses the authentication delegation scheme according to the present exemplary embodiment can be accomplished in a network having a configuration illustrated in FIG. 1.

FIG. 1 illustrates an example of the system configuration of the device resource management system. The device resource management system includes a wide area network (WAN) 100, a local area network (LAN) 101, an authorization server 200, and a resource server 210. According to the present exemplary embodiment, a world wide web (WWW) system is provided as the WAN 100.

The LAN 101 connects the components to one another.

The authorization server 200 is provided so as to operate on the basis of OAuth. The authorization server 200 includes an authorization service module.

The resource server 210 provides resource services, such as a data synchronization and storage application.

Note that a single resource server may provide only one resource service or a plurality of resource services.

A client terminal 220 has a web browser installed therein.

An image forming apparatus 300 has at least one resource service cooperation application installed therein.

A user requests a resource service using the resource service cooperation application. In addition, the authorization server 200, the resource server 210, the client terminal 220, and the image forming apparatus 300 are connected to one another via the WAN 100 and the LAN 101.

Note that the authorization server 200, the resource server 210, the client terminal 220, and the image forming apparatus 300 may be located in separate LANs or in the same LAN. In addition, the authorization server 200 and the resource server 210 may be located in the same server device or in separate server devices. According to the present exemplary embodiment, the authorization server 200 and the resource server 210 are located in separate server devices.

Figure 2:
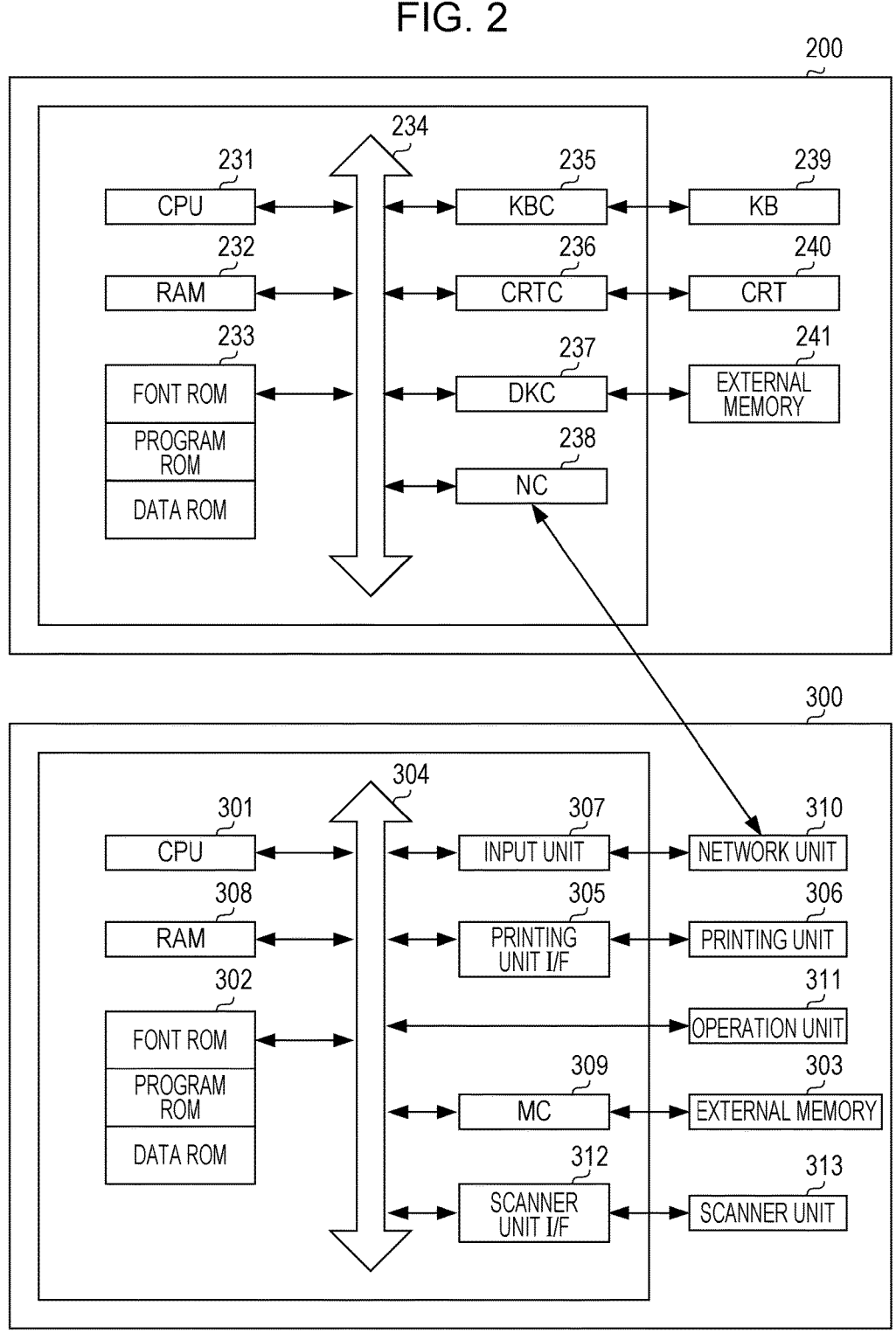
FIG. 2 illustrates an example of the hardware configuration of each of units that constitute the device resource management system.
Figure 3A:
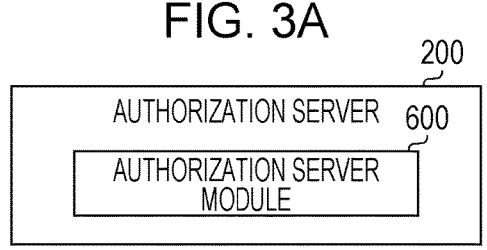
FIGS. 3A to 3D illustrate an example of the software configuration of units that constitute the device resource management system.
Figure 3B:
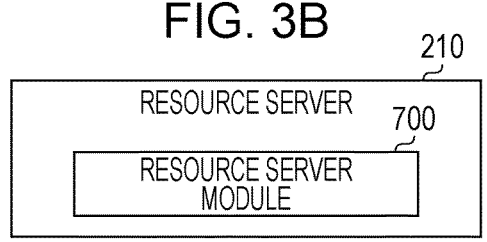
Figure 3C:
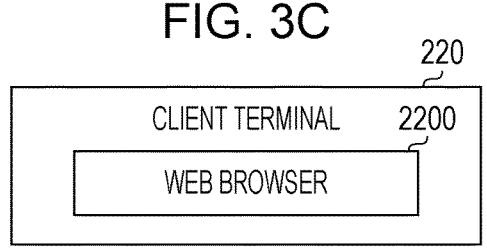
Figure 3D:
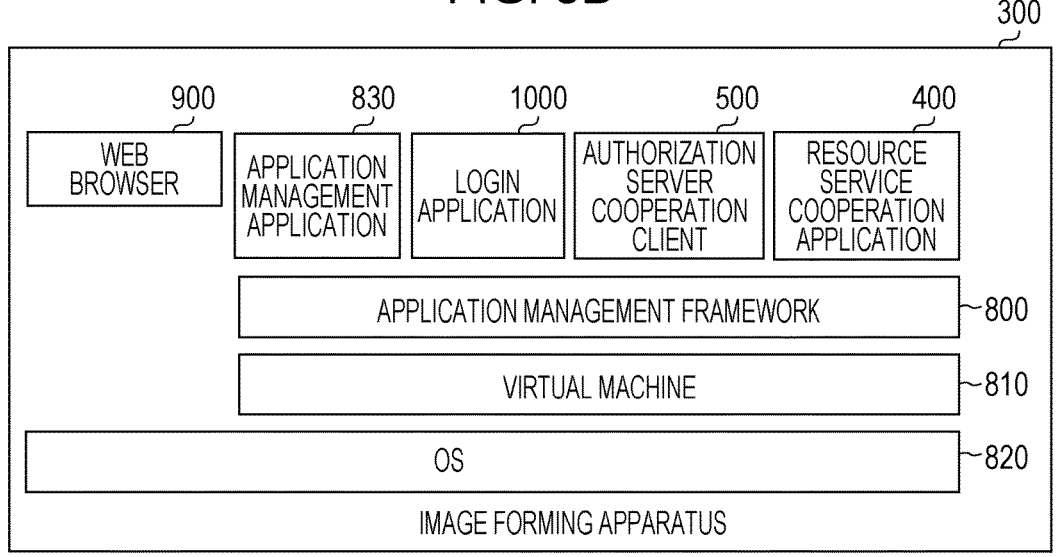

The device resource management system that uses the authentication delegation scheme according to the present exemplary embodiment is provided in a system including the server and the image forming apparatus having the configurations illustrated in FIG. 2.

FIG. 2 illustrates the authorization server 200 and the image forming apparatus 300 that are connected to each other via the WAN 100 and the LAN 101 so as to communicate with each other.

The configuration of the authorization server 200 is described first. Note that the hardware configuration illustrated in FIG. 2 corresponds to the hardware configuration of a widely used information processing apparatus. According to the present exemplary embodiment, the authorization server 200 can have the hardware configuration of a widely used information processing apparatus. This can apply to the resource server 210 and the client terminal 220 in addition to the authorization server 200.

As illustrated in FIG. 2, a central processing unit (CPU) 231 executes programs, such as an operating system (OS) and applications, stored in a program ROM of the ROM 233 or loaded from an external memory 241, such as a hard disk (HD), into a read only memory (RAM) 232. The CPU 231 controls the blocks connected to a system bus 234. Each of sequencing processes performed by the authorization server 200, which are described in more detail below, is realized by the program executed by the CPU 231.

The RAM 232 serves as a main memory and a work area of the CPU 231.

A keyboard controller (KBC) 235 controls key input received from a keyboard (KB) 239 and a pointing device.

A CRT controller (CRTC) 236 controls display of an image on a CRT display (CRT) 240.

A disk controller (DKC) 237 controls data access to the external memory 241, such as a hard disk (HD), that stores a variety of data items.

A network controller (NC) 238 performs a communication control process with the image forming apparatus 300 and other devices connected thereto via the WAN 100 or the LAN 101.

When the CPU 231 performs a process on the basis of the programs stored in the ROM 233 or the external memory 241, the software configuration of the authorization server 200 and the sequencing process of the authorization server 200 described below are realized.

Similarly, the CPU 231 of the resource server 210 performs a process on the basis of a program stored in the ROM 233 or the external memory 241 of the resource server 210. In this manner, the software configuration of the resource server 210 and the sequencing process and the flowchart related to the resource server 210 described below are realized.

The configuration of the image forming apparatus 300 is described next. A CPU 301 is included in the image forming apparatus 300.

The CPU 301 controls the blocks connected to a system bus 304 on the basis of control programs stored in a ROM 302 and an external memory 303. An image signal generated through a process performed by the CPU 301 is output to a printing unit 306 via a printing unit interface (I/F) 305 as output information. In addition, the CPU 301 can perform a communication process with the authorization server 200 via an input unit 307 and a network unit 310. Thus, information in the image forming apparatus 300, for example, can be sent to the authorization server 200.

A program ROM of the ROM 302 stores, for example, a control program to be executed by the CPU 301. A font ROM of the ROM 302 stores, for example, font data used when the output information is generated. A data ROM of the ROM 302 stores, for example, information that is received and transmitted from and to the authorization server 200 when the image forming apparatus does not have the external memory 303, such as a hard disk.

A RAM 308 serves as a main memory and a work area of the CPU 301. The memory capacity of the RAM 308 is expandable by using an option RAM connected to an extension port. In addition, the RAM 308 is used as, for example, an output information expansion area, an environment data storage area, and a nonvolatile random access memory (NVRAM).

Access to the external memory 303 is controlled by a memory controller (MC) 309. The external memory 303 is optionally connected to store, for example, font data, an emulation program, and form data. An operation unit 311 includes a switch and an LED indicator used for operation. A scanner unit I/F 312 sends, to the CPU 301, image data received from a scanner unit 313. In addition, when the user performs an operation to start scanning a document image using the operation unit 311, the scanner unit I/F 312 sends a document scanning instruction to the scanner unit 313. Upon receiving the document scanning instruction via the scanner unit I/F 312, the scanner unit 313 scans the document and sends back readout document data to the scanner unit I/F 312.

The software configuration of the image forming apparatus 300 and a sequencing process of the image forming apparatus 300 can be realized by the CPU 301 that performs processes on the basis of the programs stored in the ROM 302 or the external memory 303.

FIGS. 3A to 3D illustrate the software configurations (the module configurations) of the authorization server 200, the resource server 210, the client terminal 220, and the image forming apparatus 300, respectively.

The authorization server 200 includes an authorization server module 600.

The resource server 210 includes a resource server module 700.

The client terminal 220 includes a web browser 2200, which serves as a user agent for using WWW.

The image forming apparatus 300 includes an OS 820, a virtual machine 810, an application management framework 800, a web browser 900, an application management application 830, and a local login application 1000. In addition, the image forming apparatus 300 includes an authorization server cooperation client 500 and a resource service cooperation application 400.

In general, a real-time OS is used as the OS 820. Recently, Linux™ is used as the OS 820 in some cases.

For example, a widely used Java™ VM can be used as the virtual machine 810. The virtual machine 810 serves as a virtual application execution environment that serves as an application controlled by the OS 820.

The application management framework 800 has a function of managing the life cycle of an application to be managed running in the application execution environment provided by the virtual machine 810. In addition, the application management framework 800 has an I/F disclosure function of mediating the exchange of a process request between an I/F that controls the above-described function and each of applications. The life cycle of an application indicates the state of the application including installation, start, stoppage, and uninstallation of the application. According to the present exemplary embodiment, the application management framework 800 is the OSGi™ framework defined by Open Services Gateway initiative (OSGi) alliance.

Each of the authorization server cooperation client 500, one or more resource service cooperation application 400, and the local login application 1000 is an application running in the application execution environment provided by the virtual machine 810. The life cycles of these applications are managed by the application management framework 800.

Upon receiving an installation request and a start request for an application from the user via a control I/F for life cycle management provided by the application management framework 800, the application management application 830 performs installation of the application and starts the application.

At that time, the authorization server cooperation client 500, the resource service cooperation application 400, and the local login application 1000 may be pre-installed in the image forming apparatus 300. Alternatively, these applications may be installed in the image forming apparatus 300 afterward using the application management application 830 and the application management framework 800. The image forming apparatus 300 further includes the web browser 900, which serves as a user agent for using WWW.

FIGS. 4A to 4D illustrate data tables stored in an external memory of the authorization server 200. However, instead of the external memory of the authorization server 200, the data tables may be stored in another server that is communicable via the LAN 101.

The table illustrated in FIG. 4A is a user management table 1200.

The user management table 1200 contains the following fields: a user ID 1201, a password 1202, a user type 1203, and a role 1204.

The authorization server 200 verifies a pair consisting of information in the user ID 1201 and the password 1202. If the pair is valid, the authorization server 200 generates authentication information to authenticate users or clients. At that time, the role 1204 indicates what privilege each user has.

The table illustrated in FIG. 4B is a client management table 1300.

The client management table 1300 contains the following fields: a client ID 1301, a client name 1302, a redirect URL 1303, and a serial number 1304. The client ID 1301 is associated with the user ID 1201 in the user management table 1200. The authorization server 200 can access the client ID 1301 using the user ID 1201 and vice versa. The client name 1302 and the redirect URL 1303 are used in the sequencing process of OAuth described below. The serial number 1304 represents a value that is registered when the client is the image forming apparatus 300 and that can uniquely identify the image forming apparatus 300.

The table illustrated in FIG. 4C is an authorization token management table 1400.

The authorization token management table 1400 contains the following fields: an authorization token ID 1401, a token type 1402, an expiration date 1403, a scope 1404, a refresh token ID 1405, a refresh expiration date 1406, and a client ID 1407. In addition, the authorization token management table 1400 contains the following fields: a user ID 1408 and an application ID 1409.

Figure 4D:
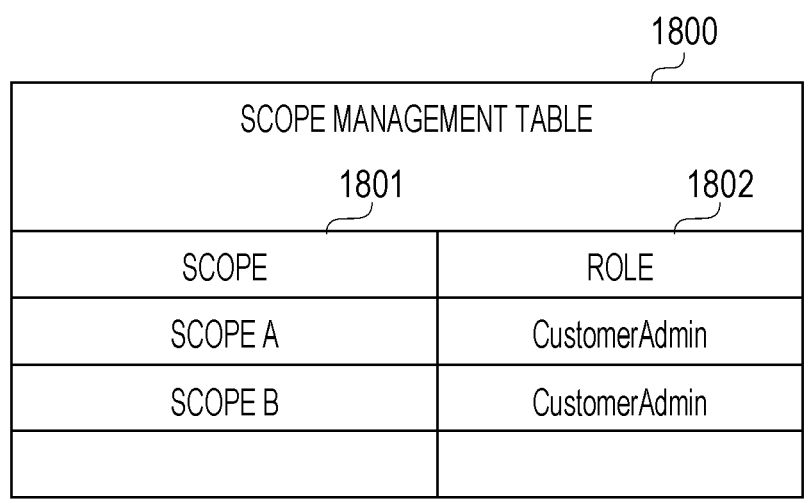

The table illustrated in FIG. 4D is a scope management table 1800.

The scope management table 1800 contains the following fields: a scope 1801 and a role 1802.

FIGS. 5A to 5C are data tables stored in the external memory of the image forming apparatus 300. The table illustrated in FIG. 5A is a device user management table 1500.

The device user management table 1500 is configured so that the local login application 1000 can refer to and update the device user management table 1500. While the present exemplary embodiment has been described with reference to the device user management table 1500 stored in the external memory of the image forming apparatus 300, the device user management table 1500 may be stored in another server that the image forming apparatus 300 can communicate with via the LAN 101.

The device user management table 1500 contains the following fields: a user ID 1501, a password 1502, an IC card information 1503, and privilege information 1504.

The local login application 1000 generates a screen for receiving a user ID and a password from the user as an input screen of the image forming apparatus 300. Thereafter, the local login application 1000 verifies whether a pair consisting of the input user Id and password matches the pair consisting of the user ID 1501 and the password 1502. If the pair is valid, the local login application 1000 generates login context including the user ID 1501. In this manner, the local login application 1000 can authenticate the users.

Alternatively, the local login application 1000 may acquire IC card information using an IC card reader connected to the image forming apparatus 300 and verify whether the acquired IC card information matches data in the IC card information 1503. If the verification is successful, the local login application 1000 may generate login context including the user ID 1501. In this manner, the local login application 1000 may authenticate the users. As used herein, the term "login context" refers to an object including the user ID 1501 of an authorized user. The login context may further include the privilege information 1504 about the privilege that the user has and user attribute information (e.g., the domain the user belongs to and the e-mail address of the user).

The table illustrated in FIG. 5B is a device management table 1600.

The device management table 1600 is configured so as to be accessed or updated by only the authorization server cooperation client 500.

The device management table 1600 contains the following fields: a client ID 1601, a client secret 1602, an end point URL 1603, and a redirect URL 1604. Note that the client ID 1601 and the client secret 1602 correspond to the user ID 1201 and the password 1202 pre-issued and stored by the authorization server 200, respectively. The redirect URL 1604 stores data that is similar to the data in the redirect URL registered in the client management table of the authorization server 200 together with the client ID 1301, the client name 1302, and the serial number 1304 of the image forming apparatus 300. To register such information, the image forming apparatus 300 may register the values online via the LAN 101 or the WAN 100. Alternatively, the user may set the values in each of the authorization server 200 and the image forming apparatus 300 through, for example, the keyboard or the operation unit. Note that the end point URL 1603 is a URL of an end point for OAuth provided by the authorization server.

Client secret is an example of credential information.

The table illustrated in FIG. 5C is a parent token management table 1700.

The parent token management table 1700 is configured so as to be accessed or updated only by the authorization server cooperation client 500.

The parent token management table 1700 contains the following fields: a user ID 1701, an authorization token ID 1702, and a refresh token ID 1703.

A sequencing process according to the present exemplary embodiment that is related to acquisition of a device token and a technique for managing data of the image forming apparatus on the resource server 210 by uniquely identifying an image forming apparatus is described below with reference to FIGS. 6A and 6B.

Figure 6A:
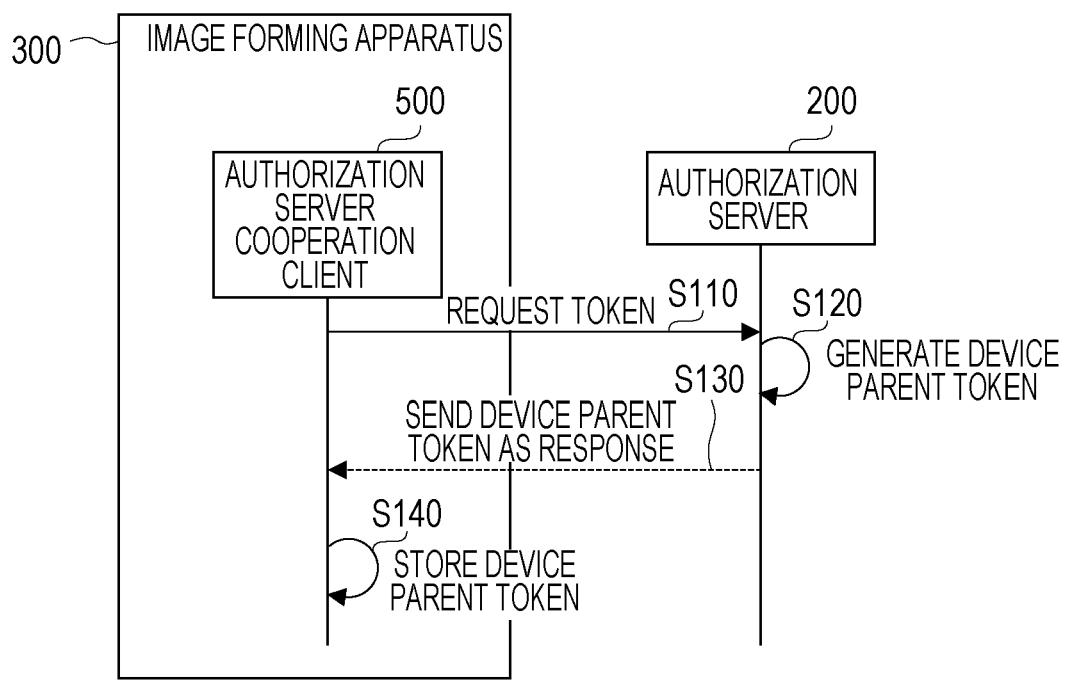
FIGS. 6A and 6B are first diagrams illustrating an example of a sequencing process.
Figure 6B:
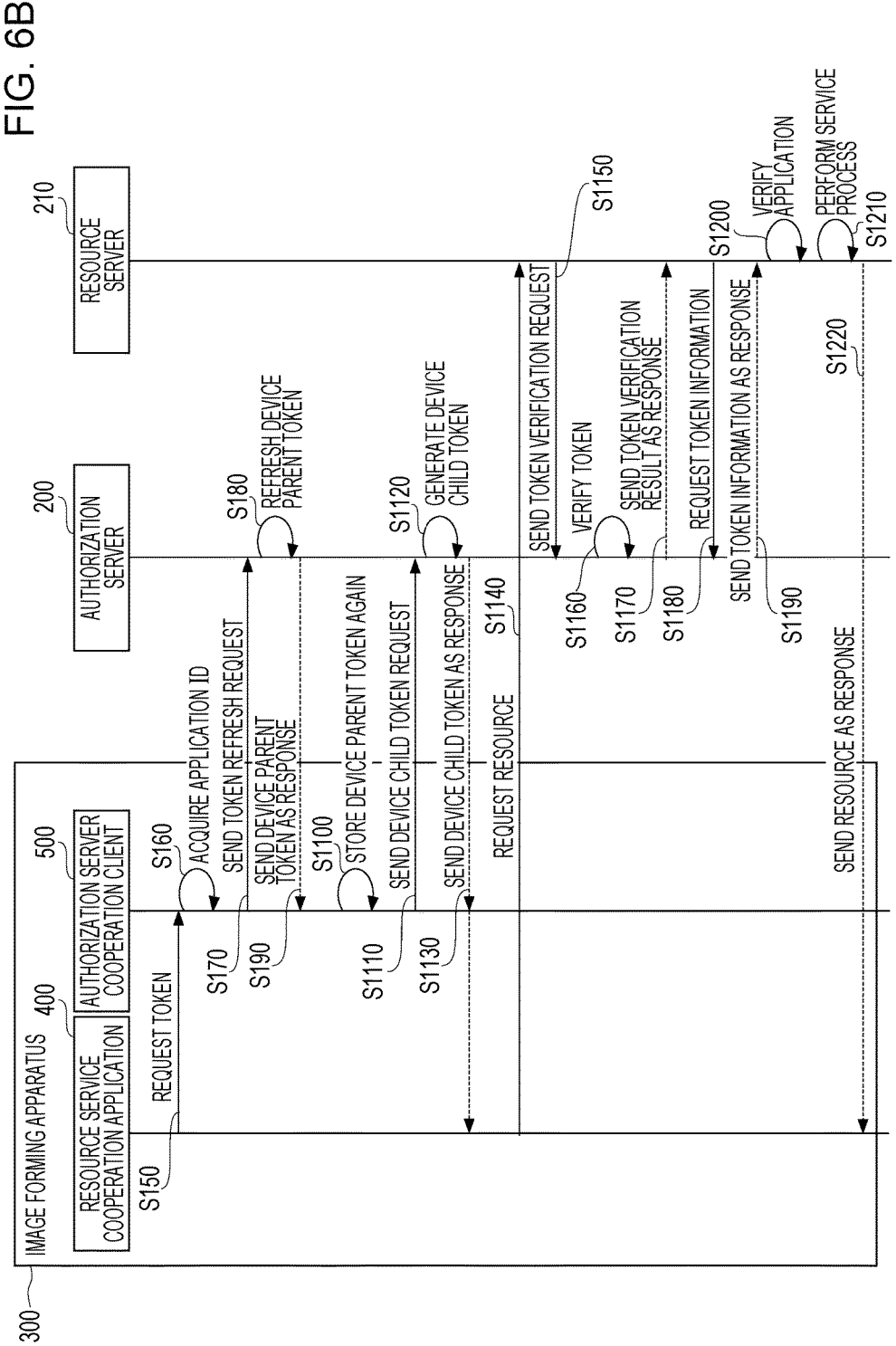

The sequencing process illustrated in FIG. 6A is related to acquisition of the device parent token. The sequencing process is performed only once when the authorization server cooperation client 500 is started for the first time.

The authorization server cooperation client 500 sends a token acquisition request to the authorization server 200 first (S110). The token acquisition request contains the client ID 1601 and the client secret 1602 stored in the device management table 1600. At that time, the authorization server cooperation client 500 may request the scope required for the token. However, according to the present exemplary embodiment, the scope is not requested.

A process performed in step S110 is an example of a first token request transmission process. In addition, the token acquisition request in step S110 is an example of a first token acquisition request.

Upon receiving the token acquisition request, the authorization server 200 verifies whether a pair consisting of the client ID and a client secret in the received token acquisition request matches the pair consisting of the user ID 1201 and the password 1202 registered in the user management table 1200.

The process to receive the token acquisition request is an example of the first token request reception process.

If the verification is successful, the authorization server 200 generates a device parent token (S120) and sends the authorization token ID of the device parent token to the authorization server cooperation client 500 as a response (S130). At that time, the authorization server 200 further stores a refresh token ID issued at the same time in the response and sends the response.

The process performed in step S130 is an example of the first token transmission process.

The authorization server 200 registers, as the device parent token, the ID of the issued token in the authorization token ID 1401, registers "device parent token" in the token type 1402, registers the expiration date in the expiration date 1403, and registers the client ID in the client ID 1407. At that time, the authorization server 200 issues a refresh token for refreshing the device parent token. Thereafter, the authorization server 200 registers the refresh token ID in the refresh token ID 1405 and registers the refresh expiration date in the refresh expiration date 1406.

Upon receiving the authorization token ID and the refresh token ID of the device parent token, the authorization server cooperation client 500 stores the authorization token ID and the refresh token ID of the device parent token in the parent token management table 1700 (S140).

The process to receive the authorization token ID and the refresh token ID is an example of the first token reception process.

The sequencing process according to the present exemplary embodiment related to acquisition of a device child token after the device parent token is issued in FIG. 6B and a technique for uniquely identifying and managing the image forming apparatus on the resource server 210 is described next.

The sequencing process is performed when the user launches the resource service cooperation application 400 of the image forming apparatus 300. Note that before the sequencing process is performed, the above-described sequencing process to acquire the device parent token needs to be performed. The resource service cooperation application 400 sends a token acquisition request to the token acquisition interface of the authorization server cooperation client 500 first (S150). At that time, the resource service cooperation application 400 can request a scope required for the token from the token acquisition interface. According to the present exemplary embodiment, the resource service cooperation application 400 requests a scope A.

Upon receiving the token acquisition request, the authorization server cooperation client 500 acquires the application ID of the resource service cooperation application 400, which is a requester, via the application management framework 800 (S160).

The resource service cooperation application 400 is an example of a management unit that manages a device resource. In addition, the application ID is an example of the identification information for identifying the management unit.

The authorization server cooperation client 500 acquires the refresh token ID stored in step S140 from the parent token management table 1700.

The authorization server cooperation client 500 sends a token refresh request to the authorization server 200 using the acquired refresh token ID and the client ID and the client secret in the device management table 1600 (S170). In this example, the expiration date of the device parent token is reached between the performance of the sequencing process to acquire the device token and the performance of the sequencing process to acquire the device child token. However, if the current time is within the expiration date of the device parent token, the authorization server cooperation client 500 may send a device child token acquisition request (described below in step S111) without sending a token refresh request.

Upon receiving the token refresh request, the authorization server 200 performs the following process. That is, the authorization server 200 verifies whether the pair consisting of the client ID and the client secret contained in the token refresh request matches the pair consisting of the user ID 1201 and the password 1202 contained in the user management table 1200. If the verification is successful, the authorization server 200 determines whether the refresh token ID contained in the token refresh request is registered in the authorization token management table 1400 and whether the present time is within the refresh expiration date. In addition, the authorization server 200 verifies whether the client ID contained in the token refresh request matches the data in the client ID 1407. If all the verifications are successful, the authorization server 200 refreshes the device parent token (S180).

The authorization server 200 sends back the authorization token ID and the refresh token ID of the refreshed device parent token to the authorization server cooperation client 500 as a response (S190). To refresh the device parent token, the authorization server 200 issues a new authorization token ID and a new refresh token ID and registers the authorization token ID and the refresh token ID in the authorization token management table 1400. At that time, the authorization server 200 inherits the data in the token type 1402, the scope 1404, and the client ID 1407 of a record identified by the refresh token ID in the received token refresh request. In addition, for example, after the authorization server 200 inherits the data, the authorization server 200 can revoke the original refresh token ID so that the original refresh token is not refreshed again. More specifically, the expiration date can be changed so that the original refresh token forcibly expires. Alternatively, the authorization server 200 can inherit the data without issuing a new refresh token ID.

Upon receiving the refreshed device parent token, the authorization server cooperation client 500 overwrites the data in the parent token management table 1700 with the received authorization token ID and refresh token ID and performs re-registration (S1100).

Thereafter, the authorization server cooperation client 500 sends a device child token acquisition request to the authorization server 200 (S1110). The authorization server cooperation client 500 sends the authorization token ID of the device parent token, the client ID and the client secret in the device management table 1600, the scope contained in the received token acquisition request, and the acquired application ID.

The process performed in step S1110 is an example of a second token request transmission process. In addition, the device child token acquisition request is an example of a second token acquisition request.

Upon receiving the device child token acquisition request, the authorization server 200 performs the following process. Note that the process to receive the device child token acquisition request is an example of a second token request reception process.

The authorization server 200 verifies whether a pair consisting of the client ID and client secret contained in the device child token acquisition request matches a pair consisting of the user ID 1201 and the password 1202 contained in the user management table 1200 first. If the verification is successful, the authorization server 200 determines whether the authorization token ID contained in the device child token acquisition request is registered in the authorization token management table 1400 and whether the present time is within the expiration date in order to evaluate the validity of the device parent token. In addition, the authorization server 200 verifies whether the client ID contained in the device child token acquisition request is the same as the client ID 1407. If all the verifications are successful, the authorization server 200 generates a device child token (S1120) and sends the device child token to the authorization server cooperation client 500 as a response (S1130). Note that the authorization server 200 includes, for example, a timer that can acquire the present time and, thus, can acquire the present time.

The process performed in S1130 is an example of a second token transmission process. In addition, the above-described verification process is an example of a first token verification process.

In this process, the authorization server 200 issues a new authorization token ID of the device child token. The authorization server 200 registers "device child token" in the token type 1402 of the authorization token management table 1400, registers the acquired application ID in the application ID 1409, and registers the scope contained in the device child token acquisition request in the scope 1404. At that time, the authorization server 200 inherits the data of the client ID 1407 in the record identified by the authorization token ID in the received child token acquisition request. As a result, the device child token issued at that time is associated with the client ID for identifying the image forming apparatus and the application ID for identifying the application.

Note that the authorization server 200 does not issue a refresh token of the device child token. The reason for that is that since a client ID and a client secret are required for sending a token refresh request, the applications that use the device child token are inhibited to send a refresh request. Another reason for that is that if the applications leak a refresh token, a security risk of having the expiration date updated without any protection may arise.

Subsequently, upon receiving the authorization token ID of the device child token, the authorization server cooperation client 500 sends the authorization token ID of the device child token to the resource service cooperation application 400, which is a requester, as a response.

The reception of the authorization token ID is an example of a second token reception process.

Upon receiving the authorization token ID of the device child token, the resource service cooperation application 400 sends a resource request containing the authorization token ID to the resource server 210 (S1140). Examples of the resource request include a request to transmit and store destination address list data of the image forming apparatus 300 and a request to receive destination address list data stored in the resource server 210.

The process performed in step S1140 is an example of a device resource request transmission process.

Upon receiving the resource request, the resource server 210 sends a token verification request containing the authorization token ID of the device child token contained in the resource request to the authorization server 200 (S1150). The resource server 210 can set the scope in the token verification request.

The reception of the resource request is an example of a device resource request reception process.

Upon receiving the token verification request, the authorization server 200 verifies whether the received authorization token ID is registered in the authorization token management table 1400 (S1160). In addition, the authorization server 200 verifies whether the present time is within the expiration date and whether the received scope is within the scope stored in the scope 1404. Thereafter, the authorization server 200 sends the result of verification to the resource server 210 as a response (S1170).

The above-described verification process is an example of a second token verification process.

Subsequently, the resource server 210 sends a token information acquisition request to acquire the information regarding the authorization token ID of the device child token to the authorization server 200 (S1180).

Upon receiving the token information acquisition request, the authorization server 200 acquires, from the authorization token management table 1400, the information identified by the received authorization token ID and sends the acquired information to the resource server 210 as a response (S1190). This response contains, for example, the data in the scope 1404, the client ID 1407, and the application ID 1409 and data in the serial number 1304 registered in the client management table 1300 identified by the client ID 1407.

Upon acquiring the token information, the resource server 210 determines whether the access to a resource for which a request is received is granted or denied on the basis of the acquired information. In this case, the resource server 210 has the application IDs that are granted access permissions prestored therein. The resource server 210 compares each of the preset application IDs with the application ID acquired from the token information so as to verify whether the access is granted or denied (S1200). If it is verified that the access is granted as a result of the verification, the resource server 210 performs a process regarding the service to be provided (S1210). For example, if a process to store destination address list data of the image forming apparatus is requested, the resource server 210 performs a process to store the destination address list data in association with the client ID 1407 acquired from the token information.

The process performed in step S1210 is an example of a service execution process.

Through such a process, the image forming apparatus can be uniquely identified, and the destination address list data can be managed on the resource server 210. After the service process is completed, the resource server 210 sends, for example, the result of the resource request to the resource service cooperation application 400 as a resource response (S1220). At that time, if the resource request is a request to receive destination address list data, the result of the resource request is the destination address list data.

While the above description has been made with reference to verification of a token made by each of the authorization server 200 and the resource server 210 through the process from step S1150 to step S1200, the applications accessible to a resource may be managed by the authorization server 200, and all the verifications may be made by the authorization server 200. In addition, while the present exemplary embodiment has been described with reference to determination of an application accessible to a resource using the application ID, the resource server 210 may determine whether the access is granted or denied on the basis of the scope acquired from the token information.

Upon receiving the resource response, the resource service cooperation application 400 performs a process on the basis of the resource response. If the resource service cooperation application 400 acquires the destination address list data from the resource server 210 as the resource response, the resource service cooperation application 400 performs a process to update the setting of the destination address list data in the image forming apparatus 300.

Through the sequencing process to acquire the device parent token and the sequencing process to acquire the device child token, the resource server 210 can identify the image forming apparatus and the application that access the resource server 210. In addition, the resource server 210 can uniquely identify the image forming apparatus on the resource server 210 and hold the data of the image forming apparatus.

FIG. 7 illustrates an example of a device data management table that is stored in an external memory by the resource server 210. The device data management table is used to hold the data of the image forming apparatus 300 in the resource server 210.

A device data management table 1900 is configured so as to be accessible and updatable by the resource server 210. The device data management table 1900 contains the following fields: a client ID 1901, a serial number 1902, and data 1903. The values corresponding to the client ID 1301 and the serial number 1304 in the client management table 1300 are stored in the client ID 1901 and the serial number 1902, respectively. The resource server 210 stores data based on the information acquired from the authorization server 200 in step S1190 described above. The data 1903 stores data transmitted from the image forming apparatus 300 in step S1140 (e.g., the destination address list data).

As described above, according to the present exemplary embodiment, a device resource (e.g., the destination address list data) can be managed in association with a device (e.g., the image forming apparatus). Accordingly, even when the user information is deleted from the server, the device resource can be managed and edited, for example.

Second Exemplary Embodiment

As described above in the first exemplary embodiment, if a device resource is managed in association with a device, it is difficult to determine which one of users who logged in the server is able to edit the device resource.

According to the present exemplary embodiment, a process for allowing a user who is authorized to edit a device resource of the device to edit the device resource in the server is described below.

The sequencing process to acquire a parent token according to the present exemplary embodiment is described with reference to FIG. 8 and FIGS. 9A to 9C.

The sequencing process is performed only once when the user uses the image forming apparatus 300 for the first time.

The user logs in onto the image forming apparatus 300 using a login scheme provided by the local login application 1000 first (S210). In this example, a user having the user ID "user001" logs in. Then, the local login application 1000 generates login context including "user001" and stores the login context in the RAM 308 so that all the applications can acquire the login context via the application management framework 800 (S220).

Figure 9A:
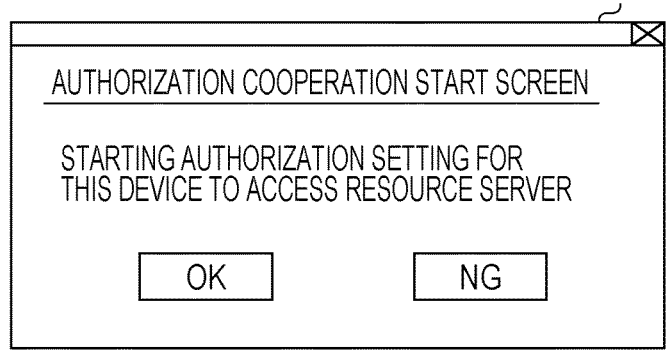
FIGS. 9A to 9C illustrate examples of screens.

Thereafter, the user operates the image forming apparatus 300 to start the web browser 900. The web browser 900 accesses a URL for starting authorization cooperation of the authorization server cooperation client 500 on the basis of the user operation (S230). At that time the authorization server cooperation client 500 may include, in a response, a screen 2001 for confirming start of the authorization cooperation as illustrated in FIG. 9A and send the response.

Upon receiving information indicating start of authorization cooperation, the authorization server cooperation client 500 performs the following process. That is, the authorization server cooperation client 500 sends a redirect request to the web browser 900 so that the web browser 900 sends an OAuth authorization request to the URL described in the end point URL 1603 of the device management table 1600 (S240). The authorization request includes the information stored in the client ID 1601 and the redirect URL 1604 of the device management table 1600. In addition, in OAuth, the authorization request can include the scope indicating a desired privilege scope to be authorized. According to the present exemplary embodiment, a scope A is requested as the scope.

Figure 9B:
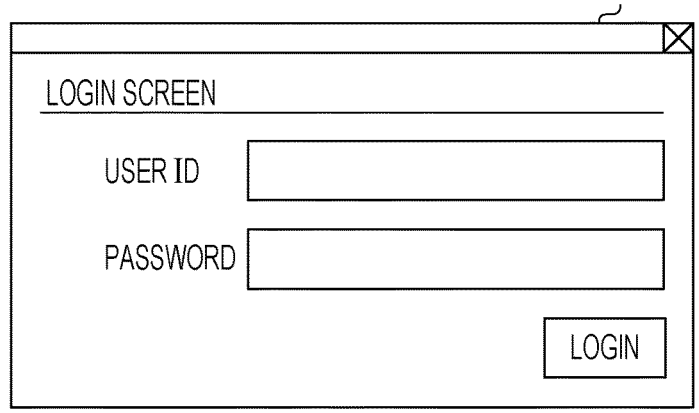
Figure 9C:
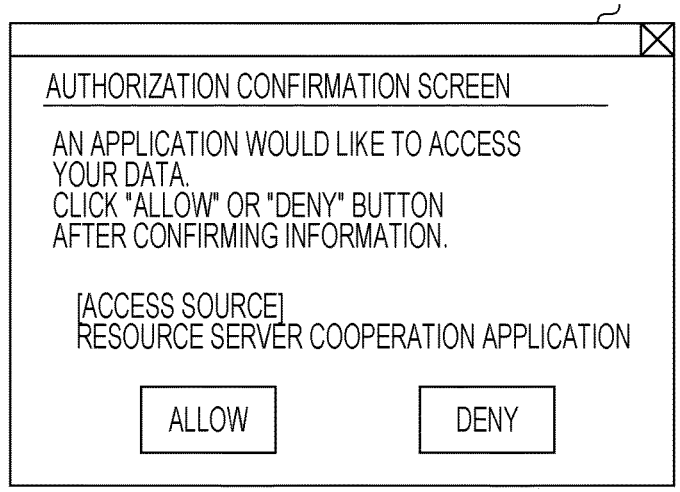

Upon receiving the authorization request, the authorization server 200 sends a login screen 2002 illustrated in FIG. 9B as a response (S250). The login screen 2002 is used to authenticate users. The user inputs the user ID and password into the login screen 2002 displayed by the web browser 900 so as to log in (S260).

The authorization server 200 verifies whether a pair consisting of the received user Id and password matches the pair registered in the user management table 1200. If the pair consisting of the received user Id and password matches the pair registered in the user management table 1200, the authorization server 200 generates authentication information associated with the user ID and performs the following process. That is, the authorization server 200 verifies whether a pair consisting of the client ID and the redirect URL contained in the authorization request matches the data registered in the client management table 1300. If the verification is successful, the authorization server 200 acquires the data in the client name 1302 of the client management table 1300, generates an authorization confirmation screen 2003 illustrated in FIG. 9C, and sends the authorization confirmation screen 2003 to the web browser 900 as a response (S270).

At that time, the authorization server 200 stores the authentication information in the response as Cookie information and sends the response to the web browser 900. Note that according to the present exemplary embodiment, the data in the client name 1302 is displayed in the authorization confirmation screen 2003. However, the authorization server 200 may store the detailed description of the client and the information about the user who logged in in the response as Cookie information and send the response to display such information in the authorization confirmation screen 2003. In addition, if the scope is contained in the authorization request, the authorization server 200 may display the information for describing the range of the scope in the authorization confirmation screen 2003.

Subsequently, the user clicks, for example, an "ALLOW" button in the authorization confirmation screen 2003 displayed by the web browser 900 so as to select authorization (S280).

Upon receiving information indicating that "ALLOW" button is selected, the authorization server 200 issues an authorization code and registers the authorization code in the authorization token management table 1400. The authorization server 200 registers the ID of the issued token in the authorization token ID 1401, registers the authorization code in the token type 1402, registers the expiration date in the expiration date 1403, and registers the client ID received in the authorization request in the client ID 1407. In addition, the authorization server 200 registers, in the user ID 1408, the user ID associated with the authentication information sent from the web browser 900 as Cookie information. Thereafter, the authorization server 200 sends the redirect URL having the authorization token ID of the authorization code attached thereto to the web browser 900 as an authorization response so as to request redirecting (S290).

Upon receiving the authorization response, the authorization server cooperation client 500 sends a token request to the authorization server 200 (S2100). The token request contains the authorization token ID of the authorization code in the acquired authorization response and the data in the client ID 1601, the client secret 1602, and the redirect URL 1604 of the device management table 1600.

Upon receiving the token request, the authorization server 200 performs the following verification. If the verification is successful, the authorization server 200 generates a parent token (S2110).

That is, the authorization server 200 verifies whether a pair consisting of the client ID and client secret received in the token request matches the pair consisting of the user ID 1201 and the password 1202 registered in the user management table 1200. Thereafter, the authorization server 200 verifies whether the authorization token ID of the authorization code in the received token request is registered in the authorization token management table 1400 and whether the present time is within the expiration date. In addition, the authorization server 200 verifies whether the client ID in the received token request matches the data in the client ID 1407 identified by the authorization token ID in the authorization token management table 1400. Furthermore, the authorization server 200 verifies whether the redirect URL in the received token request matches the data in the redirect URL 1303 of the client management table 1300.

In this case, the authorization server 200 may add a column into the authorization token management table 1400 and register the redirect URL in the column when the authorization code is issued. Thereafter, the authorization server 200 may perform verification by comparing the redirect URL in the received token request with the redirect URL in the above-described column.

If all the verifications are successful, the authorization server 200 generates a parent token and sends the authorization token ID of the parent token to the authorization server cooperation client 500 as a parent token response (S2120). At that time, the authorization server 200 sets the refresh token ID issued at the same time in the parent token response and sends the parent token response.

The authorization server 200 registers, as the parent token, the ID of the issued token in the authorization token ID 1401, registers "parent token" in the token type 1402, and registers the expiration date in the expiration date 1403. In addition, the authorization server 200 registers the client ID in the client ID 1407 and registers the user ID in the user ID 1408 as the data to be inherited from the authorization code. At that time, the authorization server 200 issues a refresh token for refreshing the parent token. In addition, the authorization server 200 registers the refresh token ID in the refresh token ID 1405 and registers the refresh expiration date in the refresh expiration date 1406.

Upon receiving the parent token response, the authorization server cooperation client 500 acquires the login context of the user who has logged in onto the image forming apparatus 300 via the application management framework 800 (S2130).

The process performed by the authorization server cooperation client 500 to acquire the parent token from the parent token response is an example of a process to acquire a third token. Note that the process to transmit the token request in step S2100 and the process to receive the parent token performed in step S2120 may be an example of the process to acquire a third token.

Thereafter, the authorization server cooperation client 500 acquires the device user ID from the login context and stores the device user ID, the authorization token ID of the parent token, and the refresh token ID in the parent token management table 1700 (S2140).

As used herein, the term "device user ID" refers to the information in the user ID 1501.

Thereafter, the authorization server cooperation client 500 sends a screen indicating that authorization cooperation is completed to the web browser 900 as a response (S2150). Thereafter, the processing is completed.

A sequencing process to acquire a child token and set an access privilege to the resource server after the parent token is issued according to the present exemplary embodiment is described below with reference to FIG. 10.

The sequencing process is performed in order to grant, to the user, access right to the data of the image forming apparatus 300 stored in the resource server 210. Note that at that time, the above-described sequencing process to acquire the parent token needs to be performed beforehand.

The user logs in onto the image forming apparatus 300 using a login scheme provided by the local login application 1000 first (S310). In this example, the user having the user ID "user001" logs in.

Then, the local login application 1000 generates login context including "user001" and stores the login context in the RAM 308 so that all the applications can acquire the login context via the application management framework 800 (S320). Note that if the process is performed immediately after the above-described sequencing process to acquire the parent token, the user need not log in again. In such a case, the sequencing process starts with step S330 described below.

Thereafter, the user operates the image forming apparatus 300 to access an application screen of the resource service cooperation application 400 (S330). If, for example, the resource service cooperation application 400 is a data synchronization and storage application for data of the image forming apparatus, the application screen is used for the user to select target data and grant the access right to the data. As used herein, the words "to access an application screen" means "to select an application using a console panel of the image forming apparatus 300", for example. Note that the application is started by the application management framework 800 and, subsequently, is displayed on the console panel in a selectable manner.

If the application screen is accessed, the resource service cooperation application 400 acquires the login context from the application management framework 800 and verifies the privilege of the login user (S340). The resource service cooperation application 400 performs the verification of the privilege on the basis of the data in the privilege information 1504 contained in the login context. For example, the privilege information 1504 is "admin", the user has a privilege of an administrator. In contrast, if the privilege information 1504 is "user", the user has a privilege of a general user. The verification of the privilege is performed in order to change a subsequently performed process in accordance with the privilege level of the target data processed by the resource service cooperation application 400 and the privilege level of the user. For example, when the resource service cooperation application 400 stores and synchronizes the destination address list data of the image forming apparatus and if the user is an administrator, the resource service cooperation application 400 determines that the user can perform access right setting for the data. However, if the user is a general user, the resource service cooperation application 400 determines that the user cannot perform access right setting for the data. Through such a process, the method for accessing the data of the image forming apparatus in the cloud can be changed in accordance with the privilege level of the user of the image forming apparatus.

Subsequently, the resource service cooperation application 400 sends a token acquisition request to the token acquisition interface of the authorization server cooperation client 500 registered in the application management framework 800 (S350). At that time, the resource service cooperation application 400 sets the acquired login context and the scope in the token acquisition request. According to the present exemplary embodiment, the scope A is continuously requested. Note that the scope A is defined as a scope used when the user that is an administrator requests access to the destination address list data, and a scope B is defined as a scope used when the user that is an administrator requests access to system setting information. The scope is defined in accordance with the privilege of the user and the target data.

The resource service cooperation application 400 changes the scope to be set in the token acquisition request to be sent.

Upon receiving the token acquisition request, the authorization server cooperation client 500 acquires the application ID of the resource service cooperation application 400, which is a requester, via the application management framework 800 (S360).

Upon acquiring the application ID, the authorization server cooperation client 500 performs the following process.

That is, the authorization server cooperation client 500 determines whether the acquired login context is valid via the application management framework 800. If the login context is valid, the authorization server cooperation client 500 acquires the device user ID associated with the login context. Note that while the above description has been made with reference to the verification of the login context performed by the authorization server cooperation client 500, another technique can be employed. For example, the verification may be performed by allowing only the application management framework 800 to generate the instance of the login context and determining whether the instance is generated.

Subsequently, the authorization server cooperation client 500 acquires the refresh token ID from the parent token management table 1700 using the acquired device user ID as a key. At that time, if the user ID is not registered in the parent token management table 1700, the authorization server cooperation client 500 may display a screen for prompting the user to perform the parent token acquisition sequencing process. Alternatively, the authorization server cooperation client 500 may start the web browser 900 to automatically start the parent token acquisition sequencing process.

The authorization server cooperation client 500 sends a token refresh request to the authorization server 200 using the acquired refresh token ID and the client ID and the client secret in the device management table 1600 (S370). Note that in this example, the parent token expires during a period of time from the performance of the parent token acquisition sequencing process to the performance of the child token acquisition sequencing process. However, if the parent token is within the expiration date, the authorization server cooperation client 500 may send a child token acquisition request in step S3110 described below without sending a token refresh request.

Upon receiving the token refresh request, the authorization server 200 performs the following process. That is, the authorization server 200 verifies whether a pair consisting of the client ID and client secret contained in the token refresh request matches a pair consisting of the user ID 1201 and the password 1202 contained in the user management table 1200 first. If the verification is successful, the authorization server 200 verifies whether the refresh token ID contained in the token refresh request is registered in the authorization token management table 1400 and whether the present time is within the refresh expiration date. In addition, the authorization server 200 verifies whether the client ID contained in the token refresh request matches the data in the client ID 1407. If all the verifications are successful, the authorization server 200 refreshes the parent token and sends the authorization token ID of the refreshed parent token and the refresh token ID to the authorization server cooperation client 500 as a response (S390). To refresh the parent token, the authorization server 200 issues a new authorization token ID and a new refresh token ID and registers the new authorization token ID and the new refresh token ID in the authorization token management table 1400. At that time, the authorization server 200 inherits the data in the token type 1402, the scope 1404, the client ID 1407, and the user ID 1408 of a record identified by the refresh token ID contained in the received token refresh request. Furthermore, after inheriting the data, the authorization server 200 can revoke the original refresh token ID so that the original refresh token ID is not refreshed again. More specifically, the expiration date can be changed so that the original refresh token forcibly expires. Alternatively, the authorization server 200 can inherit the data without issuing a new refresh token ID.

Upon receiving the refreshed parent token, the authorization server cooperation client 500 overwrites the data in the parent token management table 1700 with the received authorization token ID and refresh token ID and performs re-registration (S3100).

Thereafter, the authorization server cooperation client 500 sends a child token acquisition request to the authorization server 200 (S3110). At that time, the authorization server cooperation client 500 sends the authorization token ID of the parent token, the client ID and the client secret in the device management table 1600, the scope contained in the received token acquisition request, and the acquired application ID.

The process performed in step S3110 is an example of a fourth token request transmission process. In addition, the scope is an example of access scope information.

Upon receiving the child token acquisition request, the authorization server 200 performs the following process. That is, the authorization server 200 verifies whether a pair consisting of the client ID and client secret contained in the child token acquisition request matches a pair consisting of the user ID 1201 and the password 1202 contained in the user management table 1200 first. If the verification is successful, the authorization server 200 determines whether the authorization token ID contained in the child token acquisition request is registered in the authorization token management table 1400 and whether the present time is within the expiration date. In addition, the authorization server 200 verifies whether the client ID contained in the child token acquisition request is the same as the data in the client ID 1407.

Furthermore, the authorization server 200 verifies whether the user who sent the access request is allowed to access the scope. The authorization server 200 acquires a role having an access right to the requested scope from the role 1802 of the scope management table 1800 first. Subsequently, the authorization server 200 acquires the access right held by the user from the role 1204 of the user management table 1200 on the basis of the user ID contained in the child token request. The authorization server 200 verifies whether the roles are the same.

If all the verifications are successful, the authorization server 200 generates a child token (S3120) and sends the child token to the authorization server cooperation client 500 as a response (S3130).

In this case, the authorization server 200 issues a new authorization token ID for the child token. The authorization server 200 registers "child token" in the token type 1402 of the authorization token management table 1400, registers the acquired application ID in the application ID 1409, and registers the scope contained in the child token acquisition request in the scope 1404. At that time, the authorization server 200 inherits the data in the client ID 1407 and the user ID 1408 of a record identified by the authorization token ID contained in the received child token acquisition request. As a result, the issued child token is associated with the user ID for identifying the user, the client ID for identifying the image forming apparatus, and the application ID for identifying the application. Note that the authorization server 200 does not issue a refresh token for the child token. The reason for that is that since a client ID and a client secret are required for sending a token refresh request, the applications that use the child token are inhibited to send a refresh request. Another reason for that is that if the applications leak a refresh token, a security risk of having the expiration date updated without any protection may arise.

Subsequently, upon receiving the authorization token ID of the child token, the authorization server cooperation client 500 sends the authorization token ID of the child token to the resource service cooperation application 400, which is a requester, as a response. The reception of the authorization token ID is an example of a fourth token reception process.

Upon receiving the authorization token ID of the child token, the resource service cooperation application 400 sends a resource request including the authorization token ID to the resource server 210 (S3140).

The process performed in step S3140 is an example of an access control request transmission process. In addition, the resource request is an example of an access control process request.

Upon receiving the resource request, the resource server 210 sends, to the authorization server 200, a token verification request to verify the authorization token ID of the child token contained in the resource request (S3150). The resource server 210 can set the scope in the token verification request.

Upon receiving the token verification request, the authorization server 200 verifies whether the received authorization token ID is registered in the authorization token management table 1400 (S3160). In addition, the authorization server 200 verifies whether the present time is within the expiration date and whether the received scope is within the scope stored in the scope 1404. Thereafter, the authorization server 200 sends the result of verification to the resource server 210 as a response (S3170).

Subsequently, the resource server 210 sends a token information acquisition request to acquire information regarding the authorization token ID of the child token to the authorization server 200 (S3180).

Upon receiving the token information acquisition request, the authorization server 200 acquires, from the authorization token management table 1400, the data identified by the received authorization token ID and sends the acquired data (token information) to the resource server 210 as a response (S3190). This response contains, for example, the data in the scope 1404, the client ID 1407, the user ID 1408, and the application ID 1409. Furthermore, the response contains the data in the serial number 1304 registered in the client management table 1300 identified by the client ID 1407.

Upon receiving the token information acquisition request, the resource server 210 determines whether the access to a resource which is a target of the resource request is granted or denied on the basis of the acquired token information. In this case, the resource server 210 has the application IDs that are granted access permissions prestored therein. The resource server 210 compares each of the preset application IDs with the application ID acquired from the token information. In this manner, the resource server 210 verifies whether the access source is a valid resource service cooperation application 400 (S3200). Thereafter, the resource server 210 identifies the data to be processed in the device data management table 1900 on the basis of the acquired serial number and sets access right (S3210).

The access right setting is described next with reference to FIG. 11. FIG. 11 illustrates an example of an access right management table 2100. The access right management table 2100 is configured so that the resource server 210 can access or update the access right management table 2100. The access right management table 2100 contains the following fields: a client ID 2101, a serial number 2102, a user ID 2103, and an access right 2104. The client ID 2101 and the serial number 2102 stores the values corresponding to the client ID 1901 and the serial number 1902 of the device data management table 1900, respectively. The user ID 2103 contains the user ID acquired from the token information. The access right 2104 contains an access level, such as "edit" or "reference". By using such settings, it is determined which user is allowed to access data of which device resource management system.

Figure 12:
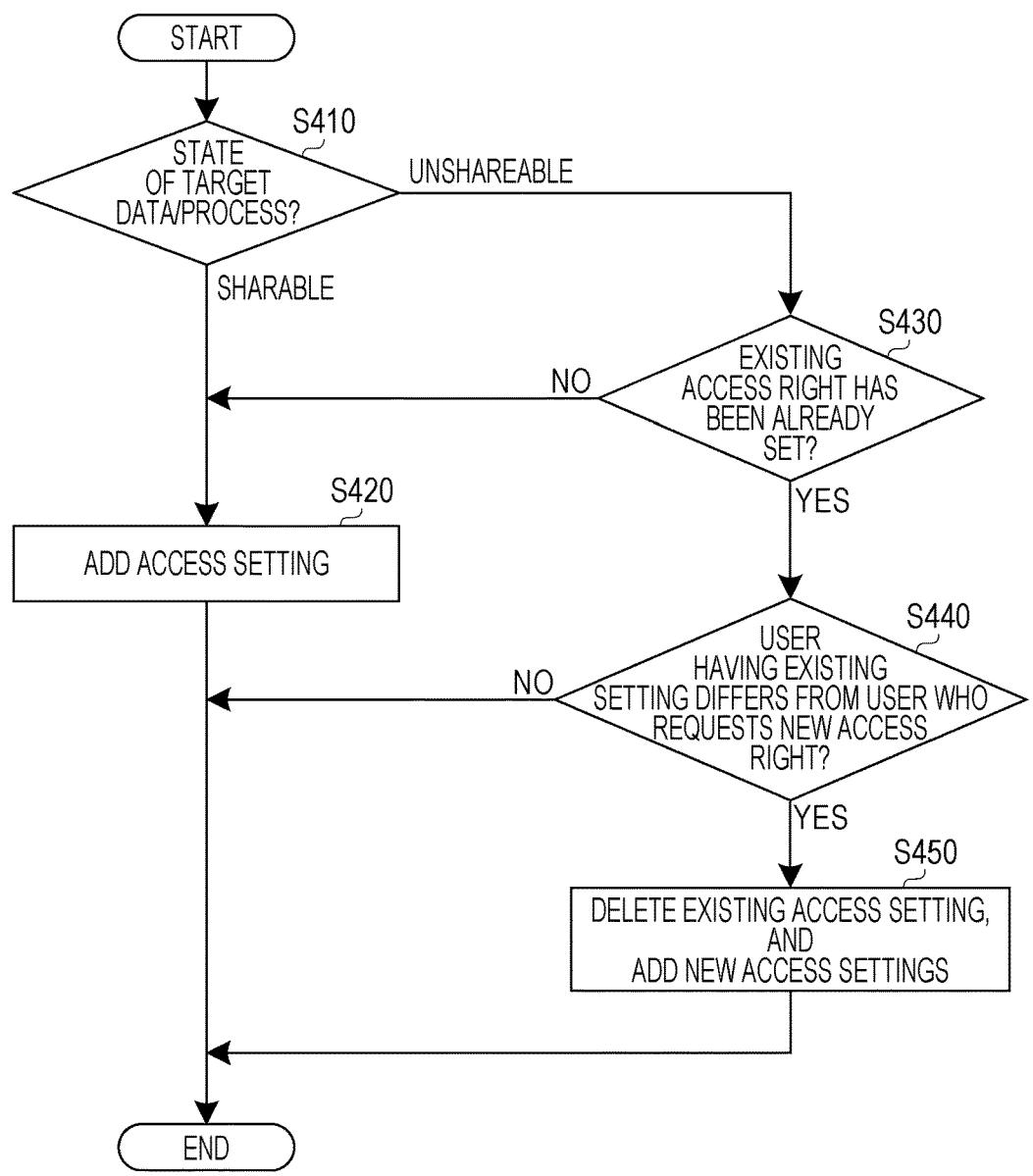
FIG. 12 is a flowchart of an access right setting process.

The access settings are described below with reference to a flowchart of an access right setting process illustrated in FIG. 12.

The resource server 210 verifies whether the target data and process of the image forming apparatus are sharable with a plurality of users first (S410). For example, a user A has an edit access right to the destination address list data of each of image forming apparatuses A, B, and C. In addition, the user A performs synchronization setting so that the three destination address list data items are the same at all times. Similarly, a user B has an edit access right to the destination address list data of each of the image forming apparatuses A, B, and C. In addition, the user A performs synchronization setting so that the three destination address list data items are the same at all times. In such a case, if the user A edits the destination address list data of one of the image forming apparatuses A, B, and C, the data in the server and the data in the image forming apparatuses A, B, and C are made the same. Thereafter, the destination address list data in the image forming apparatus C is set in image forming apparatuses D and E on the basis of the settings of the image forming apparatus B. Accordingly, the setting of the image forming apparatus A is applied to the image forming apparatus that should not be accessed. Thus, the destination address list data of an image forming apparatus must not be shared by a plurality of users for editing. Note that the criterion of the determination varies in accordance with the function of the resource server, the target data of the image forming apparatus, and the privilege of the operating user.

If, in step S410, the data and process are sharable, the resource server 210 adds an access right (S420). However, if the data and process are unshareable, the resource server 210 determines whether the target data already has access right settings (S430). If the target data has no access right settings, the resource server 210 adds the access right as normal (S420).

However, if the target data already has access right settings, the resource server 210 determines whether the user set for accessing is the same as the user who sent a new access request (S440). If the users are the same, the resource server 210 does not perform any special process. However, if the users differ from each other, the resource server 210 deletes the existing setting and applies a new access setting (S450).

Through such a process, access setting for particular data that allows a plurality of users to access the data can be prevented. While the present exemplary embodiment has been described with reference to sharing on a user-by-user basis, the access right control may be performed on a user-group by user-group basis. In such a case, if any one of the users who belongs to a user group A and has a particular privilege performs access setting, the resource server 210 grants access permission to all of the users who belong to the user group A and have the same privilege. However, when the data and process are unshareable and if a user in another user group B attempts to set access permission, the resource server 210 revokes all of the access permissions from the user group A and sets access permission from the user group B.

If the access setting is completed, the resource server 210 sends the result of setting to the resource service cooperation application 400 as a response (S3220).

While the above description has been made with reference to verification of a token made by each of the authorization server 200 and the resource server 210 through the process from step S3150 to step S3200, the applications that are allowed to access a resource may be managed by the authorization server 200, and all the verifications may be made by the authorization server 200.

Upon receiving the resource response, the resource service cooperation application 400 generates the above-described application screen on the basis of the received data and sends the screen to the user as a response (S3230).

Through the acquisition of a child token and the access right setting for the resource server, it can be determined which user on the server is allowed to access the data of an image forming apparatus maintained in the server.

When the client terminal 220 logs in onto a service provided by the resource server 210 to user the service, the data of the image forming apparatus for which the user performed access setting is displayed. Thus, the user can perform a variety of operations (e.g., editing and distribution setting).

According to the above-described exemplary embodiments, even when the user information in a cloud service is deleted, a device resource in the cloud service is made editable.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-113053 filed May 29, 2013, which is hereby incorporated by reference herein in its entirety.

What is claimed is:

1. An image forming apparatus comprising:
    at least one processor; and
    at least a memory storing instructions that, when executed by the least one processor, cause the information processing apparatus to execute:
    a management unit that manages a device resource,
    a first token request transmission unit configured to transmit, to a server device, a first token acquisition request containing device credential information,
    a first token reception unit configured to receive, from the server device, a first token corresponding to the device credential information,
    a storage unit configured to store the first token received by the first token reception unit,
    a second token request transmission unit configured to acquire the first token stored in the storage unit and transmit, to the server device, a second token acquisition request containing a valid first token and identification information for identifying the management unit that manages the device resource, wherein, in a case where the first token stored in the storage unit is not valid, the second token request transmission unit transmits, before transmitting the second token acquisition request, a third token acquisition request and, in response, receives a third token that is used for refreshing the first token, and then acquires the refreshed first token and restores the not valid first token with the acquired refreshed first token as the valid first token in the storage unit,
    a second token reception unit configured to receive, from the server device, a second token corresponding to the identification information; and
    a device resource request transmission unit configured to transmit, to a resource server, a request for a process related to the device resource, wherein the request contains the second token received by the second token reception unit,
    wherein, in response to determining that an expiration date of the first token stored in the storage unit is reached between performance of sequencing process to acquire the first token and performance of the sequencing process to acquire the second token, it is determined that the first token stored in the storage unit is not valid.

2. The image forming apparatus according to claim 1, further comprising:
    an acquisition unit configured to acquire the third token, wherein the third token corresponds to privilege information regarding a user who logs in onto the image forming apparatus;
    a fourth token request transmission unit configured to transmit, to the server device, a fourth token acquisition request containing the third token acquired by the acquisition unit, the device credential information, the identification information for identifying the management unit, and access scope information corresponding to the privilege information regarding the user;
    a fourth token reception unit configured to receive, from the server device, a fourth token corresponding to the identification information; and
    an access control request transmission unit configured to transmit, to the server device, an access control process request for a device resource on the server device, wherein the access control process request contains the fourth token received by the fourth token reception unit.

3. The image forming apparatus according to claim 2, wherein the fourth token request transmission unit changes the access scope information contained in the fourth token acquisition request in accordance with the privilege information regarding the user.

4. The image forming apparatus according to claim 1, wherein the second token received by the second token reception unit is not a refresh token of the second token.

5. The image forming apparatus according to claim 1, wherein information regarding a user of the image forming apparatus who is allowed to manage and edit the electronic document is deleted from the resource server.

6. The image forming apparatus according to claim 5,
   wherein the device resource is an electronic document stored in the resource server,
   wherein the process related to the electronic document is a process that allows a user to manage and edit the electronic document, and
   wherein, even though information regarding a user who is allowed to manage and edit the electronic document is deleted from the resource server, the utilization of the valid first token, the identification information for identifying the management unit that manages the device resource, and the second token allows the user to manage and edit the electronic document.

7. An information processing method for use in an image forming apparatus having a management unit that manages a device resource, the information processing method comprising:
   transmitting, to a server device, a first token acquisition request containing device credential information;
   receiving from the server device, a first token corresponding to the device credential information;
   storing the received first token in a storage unit;
   acquiring the first token stored in the storage unit and transmitting, to the server device, a second token acquisition request containing a valid first token and identification information for identifying the management unit that manages the device resource, wherein, in a case where the first token stored in the storage unit is not valid, transmitting includes transmitting, before transmitting the second token acquisition request, a third token acquisition request and, in response, receives a third token that is used for refreshing the first token, and then acquires the refreshed first token and restores the not valid first token with the acquired refreshed first token as the valid first token in the storage unit;
   receiving, from the server device, a second token corresponding to the identification information; and
   transmitting, to a resource server, a request for a process related to the device resource, wherein the request contains the received second token,
   wherein, in response to determining via at least one processor that an expiration date of the first token stored in the storage unit is reached between performance of sequencing process to acquire the first token and performance of the sequencing process to acquire the second token, it is determined that the first token stored in the storage unit is not valid.

8. The information processing method according to claim 7, further comprising:
   acquiring the third token, wherein the third token corresponds to privilege information regarding a user who logs in onto the image forming apparatus;
   transmitting, to the server device, a fourth token acquisition request containing the acquired third token, the device credential information, the identification information for identifying the management unit, and access scope information corresponding to the privilege information regarding the user;
   receiving, from the server device, a fourth token corresponding to the identification information; and
   transmitting, to the server device, an access control process request for a device resource on the server device, wherein the access control process request contains the received fourth token.

9. The information processing method according to claim 8, wherein transmitting the fourth token acquisition request includes changing the access scope information contained in the fourth token acquisition request in accordance with the privilege information regarding the user.

10. A non-transitory computer-readable storage medium storing a program to cause an image forming apparatus to perform an information processing method, wherein the image forming apparatus includes a management unit that manages a device resource, the information processing method comprising:
    transmitting, to a server device, a first token acquisition request containing device credential information;
    receiving from the server device, a first token corresponding to the device credential information;
    storing the received first token in a storage unit;
    acquiring the first token stored in the storage unit and transmitting, to the server device, a second token acquisition request containing a valid first token and identification information for identifying the management unit that manages the device resource, wherein, in a case where the first token stored in the storage unit is not valid, transmitting includes transmitting, before transmitting the second token acquisition request, a third token acquisition request and, in response, receives a third token that is used for refreshing the first token, and then acquires the refreshed first token and restores the not valid first token with the acquired refreshed first token as the valid first token in the storage unit;
    receiving, from the server device, a second token corresponding to the identification information; and
    transmitting, to a resource server, a request for a process related to the device resource, wherein the request contains the received second token,
    wherein, in response to determining via at least one processor that an expiration date of the first token stored in the storage unit is reached between performance of sequencing process to acquire the first token and performance of the sequencing process to acquire the second token, it is determined that the first token stored in the storage unit is not valid.

11. The non-transitory computer-readable storage medium according to claim 10, the information processing method further comprising:
    acquiring the third token, wherein the third token corresponds to privilege information regarding a user who logs in onto the image forming apparatus;
    transmitting, to the server device, a fourth token acquisition request containing the acquired third token, the device credential information, the identification information for identifying the management unit, and access scope information corresponding to the privilege information regarding the user;

receiving, from the server device, a fourth token corresponding to the identification information; and transmitting, to the server device, an access control process request for a device resource on the server device, wherein the access control process request contains the received fourth token.

12. The non-transitory computer-readable storage medium according to claim 11, wherein transmitting the fourth token acquisition request includes changing the access scope information contained in the fourth token acquisition request in accordance with the privilege information regarding the user.

* * * * *